(12) United States Patent
Noguchi

(10) Patent No.: US 7,962,258 B2
(45) Date of Patent: Jun. 14, 2011

(54) OPERATOR-SIDE SYSTEM AND MODE FILE IDENTIFYING METHOD

(75) Inventor: Kiyoshige Noguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 889 days.

(21) Appl. No.: 11/065,458

(22) Filed: Feb. 25, 2005

(65) Prior Publication Data

US 2005/0192722 A1    Sep. 1, 2005

(30) Foreign Application Priority Data

Feb. 27, 2004    (JP) ................ P2004-055044

(51) Int. Cl.
*G01M 17/00* (2006.01)
(52) U.S. Cl. ............... 701/35; 701/29; 701/30; 701/31; 701/32; 701/33; 701/34; 340/500
(58) Field of Classification Search .......... 701/1, 29–35, 701/36; 340/426.22–426.35
See application file for complete search history.

(56) References Cited

U.S. PATENT DOCUMENTS

| | | | |
|---|---|---|---|
| 4,975,848 A | 12/1990 | Abe et al. | |
| 5,127,005 A | 6/1992 | Oda et al. | |
| 5,400,018 A | 3/1995 | Scholl et al. | |
| 6,768,935 B1 * | 7/2004 | Morgan et al. ............ | 701/29 |
| 6,957,136 B2 * | 10/2005 | Tachibana et al. ......... | 701/35 |
| 7,239,946 B2 * | 7/2007 | Sowa ............................ | 701/29 |
| 7,467,035 B2 * | 12/2008 | Sayce-Jones ............... | 701/36 |
| 2002/0007237 A1 * | 1/2002 | Phung et al. ............... | 701/33 |
| 2002/0059270 A1 | 5/2002 | Schlabach et al. | |
| 2002/0156558 A1 | 10/2002 | Hanson et al. | |
| 2002/0169530 A1 * | 11/2002 | Laguer-Diaz et al. ..... | 701/35 |
| 2003/0050747 A1 * | 3/2003 | Kamiya ....................... | 701/33 |
| 2005/0171661 A1 * | 8/2005 | Abdel-Malek et al. .... | 701/33 |

FOREIGN PATENT DOCUMENTS

| | | |
|---|---|---|
| DE | 195 23 483 A1 | 6/1995 |
| JP | 64-083435 | 3/1989 |
| JP | 5-172702 | 7/1993 |
| JP | 2589617 | 12/1996 |
| JP | 2001-221715 | 8/2001 |
| JP | 2002-70637 | 3/2002 |
| JP | 2002-202003 | 7/2002 |
| JP | 2002-331884 | 11/2002 |
| JP | 2003-19931 | 1/2003 |

* cited by examiner

*Primary Examiner* — Jack Keith
*Assistant Examiner* — Jonathan M Dager
(74) *Attorney, Agent, or Firm* — McGinn Intellectual Property Law Group, PLLC

(57) ABSTRACT

A storing unit stores a map indicating correspondences between keywords representing states of a vehicle and faulty conditions of the vehicle. A keyword setting unit sets the keywords in response to the vehicle as a recorded object. A processing unit identifies the faulty condition corresponding to the set keywords by searching the storing unit. Then, the mode file corresponding to the identified faulty condition is decided as the mode file to be set in a data recording system, based on correspondences between the previously-set faulty conditions and data contents to be recorded and conditions.

14 Claims, 8 Drawing Sheets

FIG. 4

| MODE FILE | ACQUIRED CONTENTS | ACQUIRING CONDITION |
|---|---|---|
| A | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. IDLE CONTROL VALVE CONTROL AMOUNT<br>7. ENGINE COOLANT TEMPERATURE | TRIGGER CONDITIONS:<br>(1) ENGINE SPEED = 0rpm<br>(2) CHANGING AMOUNT OF ENGINE SPEED EXCEEDS PREDETERMINED VALUE<br>RECORDING TIME:<br>(1) 10 MINUTES BEFORE AND AFTER CONDITIONS ARE SATISFIED<br>(2) 10 MINUTES BEFORE AND AFTER CONDITIONS ARE SATISFIED<br>SAMPLING RATE:<br>(1) HIGHEST<br>(2) HIGHEST |
| B | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. IDLE CONTROL VALVE CONTROL AMOUNT<br>7. ENGINE COOLANT TEMPERATURE<br>8. STARTING FUEL CONTROL<br>9. STARTING IGNITION CONTROL<br>10. BATTERY VOLTAGE | TRIGGER CONDITIONS:<br>(1) ON OF IGNITION SWITCH (OR TURN ON OF RECORDING SYSTEM)<br>RECORDING TIME:<br>(1) 10 MINUTES AFTER CONDITIONS ARE SATISFIED<br>SAMPLING RATE:<br>(1) 1 MINUTE FROM START OF RECORDING → HIGHEST,<br>1 MINUTE TO 10 MINUTES→ EVERY 1 SECOND |
| C | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. G SENSOR VALUE<br>7. AT GEAR POSITION<br>8. IGNITION LEARNED VALUE (LEARNING MAP)<br>9. FUEL LEARNED VALUE (LEARNING MAP)<br>10. PERIPHERAL INFORMATION | TRIGGER CONDITIONS:<br>(1) MISFIRE DECISION<br>(2) START AND END OF DATA ACQUISITION (CONTENTS 8, 9, 10)<br>RECORDING TIME:<br>(1) 10 MINUTES BEFORE CONDITIONS ARE SATISFIED<br>(2) ONCE WHEN CONDITIONS ARE SATISFIED<br>SAMPLING RATE:<br>(1) HIGHEST |
| D | 1. ENGINE SPEED<br>2. VEHICLE SPEED<br>3. INTAKE PIPE PRESSURE<br>4. IGNITION ADVANCED ANGLE<br>5. FUEL INJECTION INTERVAL | TRIGGER CONDITIONS:<br>(1) MIL TURNED ON<br>RECORDING TIME:<br>(1) 10 MINUTES BEFORE AND AFTER CONDITIONS ARE SATISFIED<br>SAMPLING RATE:<br>(1) EVERY 1 SECOND |
| ⋮ | ⋮ | ⋮ |

FIG. 5

| MODEL FILE | KEYWORD | FAULT CONDITION |
|---|---|---|
| A | ENGINE STOP (ENGINE STALL)<br>ROUGH IDLE<br>LACK OF STABILITY OF THE IDLING<br>WOBBLING OF ENGINE NOISE<br>VIBRATION<br>TC XX<br>⋮ | ROUGH IDLE |
| B | WOBBLING OF ENGINE NOISE<br>THE ENGINE DOES NOT START<br>TC YY<br>⋮ | DEFECTIVE ENGINE START |
| C | STRANGE SOUND<br>VIBRATION<br>RATTLING OF ENGINE NOISE<br>TC ZZ<br>⋮ | ABNORMAL VIBRATION |
| D | NONE | NONE |
| ⋮ | ⋮ | ⋮ |

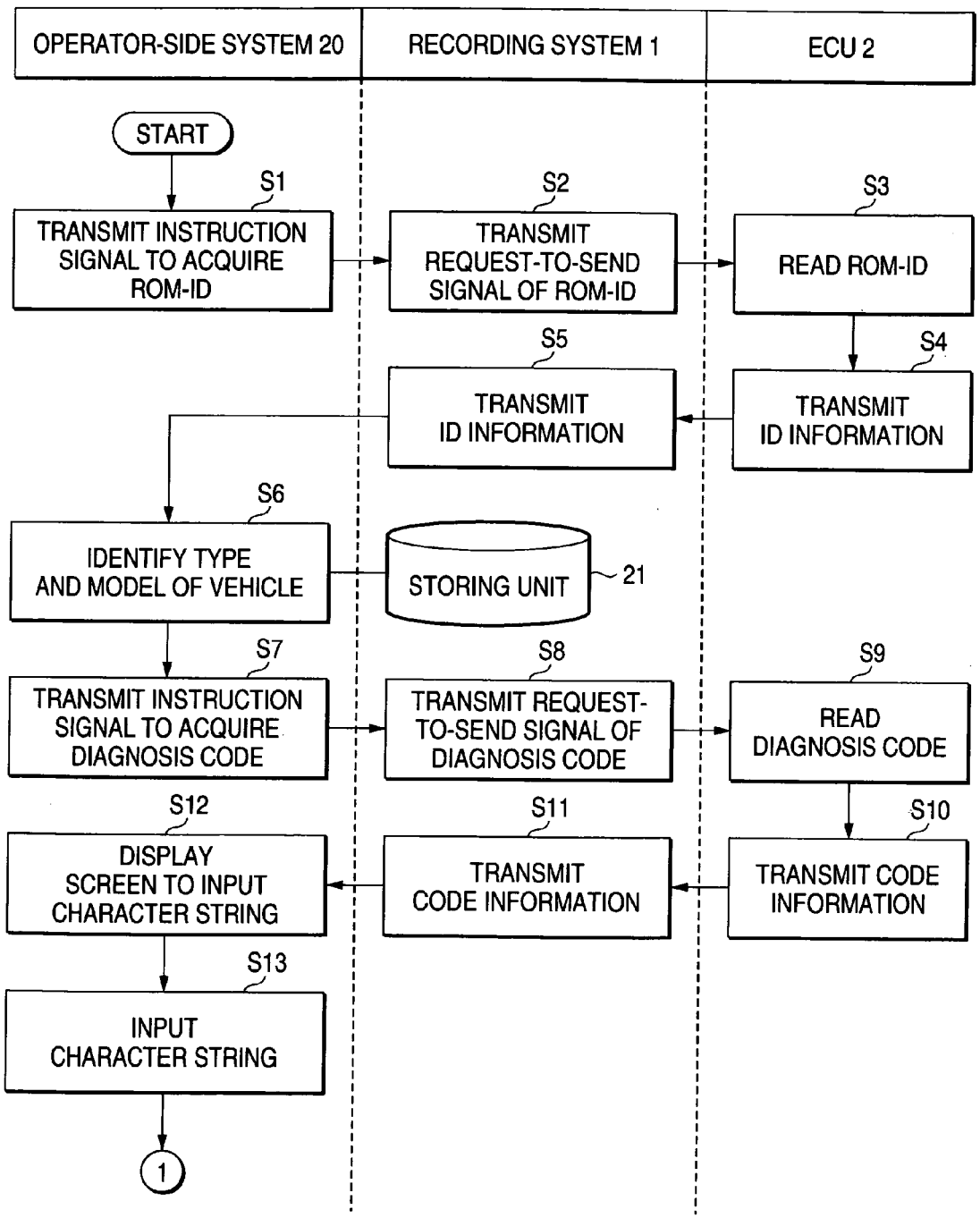

OPERATOR-SIDE SYSTEM AND MODE FILE IDENTIFYING METHOD

The present application claims foreign priority based on Japanese Patent Application P.2004-055044, filed Feb. 27, 2004, the contents of which are incorporated herein by reference.

BACKGROUND OF THE INVENTION

The present invention relates to an operator-side system and a mode file identifying method, and more particularly, an approach of determining a mode file in response to the faulty condition that may be presently caused in the vehicle that outputs control parameters serving as recorded objects.

In the prior art, in order to identify the faulty condition of the vehicle, the data recording system for downloading the control parameter of the control unit equipped in the vehicle, and then recording such parameter is known. For example, in the data recording system in JP-A-2002-070637, first the operating conditions such as name of acquired signal, sampling rate, trigger mode, and the like are set. Then, various data (i.e., control parameters) in the control unit on the vehicle side are sampled based on the operating conditions on a time-series basis. Then, when the conditions under which the data that are useful for identifying the faulty conditions of the vehicle will be obtained are satisfied, the sampling data are stored in a data recording unit.

Further, JP-B2-2589617 discloses a vehicle failure diagnosis system. When this system holds a data communication with the electronic control device in the vehicle, such system can accept the failure code generated in the electronic control device. Then, the appropriate work schedule and the appropriate inspection approach are chosen among a plurality of work schedules and inspection approaches in answer to the failure code, and then they are displayed.

However, in case an operating conditions, i.e., a data contents to be recorded and a conditions, are not appropriately set for the data recording system, such disadvantages arise that the system records unnecessary data or conversely the system fails to record necessary data. For this reason, in the data recording system of this type, the operating conditions that are useful for identifying the faulty condition are determined in advance by an operator, and set. As the approach of determining the operating conditions, as disclosed in JP-B2-2589617, for example, the approach of referring to the diagnosis code generated in the control unit and then deciding the operating conditions in response to the diagnosis code may be thought of. Meanwhile, from the viewpoint of acquiring effectively the data, it is preferable that the faulty conditions should be subdivided and then the optimum operating condition should be set to deal with an individual faulty condition. However, when the faulty conditions are divided into parts, in some cases the diagnosis code does not always correspond to the faulty condition. Therefore, it is preferable that the operating conditions should beset after the faulty condition that is occurring in the vehicle is forecasted more specifically.

SUMMARY OF THE INVENTION

The present invention has been made in view of such circumstances, and an object of the present invention is to determine appropriately data contents and conditions to be recorded by a data recording system, in response to a faulty condition of a vehicle as the recorded object.

In order to overcome such problem, a first aspect of the present invention provides an operator-side system. The operator-side system comprises a storing unit for storing a plurality of mode files, codes that are correlated with the mode files respectively and are able to identify a faulty condition of a vehicle, and keywords that are correlated with the mode files respectively and are able to identify the faulty condition of the vehicle; a keyword setting unit for setting the codes that are acquired from a control unit mounted on the vehicle via a network, which can transmit/receive information to/from the control unit, and the keywords input by an operator as search keys; and a processing unit for identifying the mode file corresponding to the search keys among the plurality of mode files based on the search keys. In respective mode files, types of the vehicle data and acquiring conditions, which are required to take measures against a particular faulty condition, out of a plurality of different vehicle data that contain control parameters in the control unit are described.

Here, in the first aspect, it is preferable that the codes comprise diagnosis codes that are generated in the control unit. Also, it is preferable that the keywords comprise character strings that reflect states of the vehicle assumed in the faulty conditions. Also, it is preferable that the keywords comprise character strings that represent driving environments through which the vehicle drives.

Also, in the first aspect, it is preferable that the storing unit should further store a predetermined mode file in which types of the vehicle data and acquiring conditions, which are required commonly to take measures against various faulty conditions that are not correlated with the codes and the keywords, are described. Further, it is preferable that the processing unit should identify the predetermined mode file when the mode file corresponding to the search keys is not identified.

Also, in the first aspect, it is preferable that the storing unit should further store a plurality of file sets that are correlated with different types and models of vehicles respectively in units of the plurality of mode files, and identifiers of the control unit that are correlated with types and models of a plurality of vehicles respectively, and the processing unit should identify a type and a model of the vehicle, which correspond to the identifiers acquired, among the types and the models of the plurality vehicles based on the identifiers acquired from the control unit and also identify a file set, which corresponds to the type and the model of the vehicle identified, among the plurality of file sets.

Also, in the first aspect, it is preferable that the mode files should contain learned values learned by the control unit or peripheral information of the vehicle as the acquired contents. Also, it is preferable that a sensitivity of an acceleration sensor should be set differently in response to individual mode file in the plurality of mode files.

In addition, in the first invention, it is preferable that the network should be able to transmit/receive information to/from a data recording system, which can execute the data communication with the control unit that records the vehicle data, based on the types and the acquiring conditions described in the mode file decided, and the keyword setting unit should acquire the codes from the control unit via the data recording system.

A second aspect of the present invention provides a mode file identifying method. This mode file identifying method comprises a step of setting codes that are acquired from a control unit mounted on a vehicle via a network that can transmit/receive information to/from the control unit, and keywords input by an operator as search keys by means of a computer; and a step of identifying the mode file corresponding to the search keys among the plurality of mode files by causing the computer to search a storing unit, in which a plurality of mode files, codes that are correlated with the mode files respectively and are able to identify a faulty condition of a vehicle, and keywords that are correlated with the mode files respectively and are able to identify the faulty condition of the vehicle are stored, based on the search keys; wherein types of the vehicle data and acquiring conditions, which are required to take measures against a particular faulty condition, out of a plurality of different vehicle data that contain control parameters in the control unit are described in respective mode files.

Here, in the second aspect, it is preferable that the storing unit should further store a plurality of file sets that are correlated with different types and models of vehicles respectively in units of the plurality of mode files, and identifiers of the control unit that are correlated with types and models of a plurality of vehicles respectively, and the computer should identify a type and a model of the vehicle, which correspond to the identifiers acquired, among the types and the models of the plurality of vehicles based on the identifiers acquired from the control unit, and also identifies a file set, which corresponds to the type and the model of the vehicle identified, among the plurality of file sets.

According to the present invention, the mode file corresponding to the search keys is identified among a plurality of mode files, while using both the codes acquired from the control unit and the keywords input by there operator as the search keys. In this manner, the number of the assumed mode files becomes enormous if various faulty conditions are contained, nevertheless the appropriate mode file can be identified automatically and easily because the mode files are narrowed down by using the search keys that contain not only the codes generated in the control unit, which outputs the data as the recorded object, but also the keywords input by the operator. In the mode files, after the faulty conditions that will arise in the vehicle are assumed, the data contents and the acquiring conditions useful for identifying the faulty conditions are correlated in advance appropriately with each other in the experiment or the simulation. As a result, the mode file that agrees with the faulty condition of the vehicle can be set in the data recording system, and therefore the effective recording of the necessary vehicle data can be attained.

BRIEF DESCRIPTION OF THE DRAWINGS

FIG. 4 is an explanatory view showing an example of a mode file.

FIG. 5 is an explanatory view of a map showing correspondences between faulty conditions and keywords.

FIG. 6 is a flowchart showing procedures of setting a mode file.

DESCRIPTION OF THE PREFERRED EMBODIMENTS

Figure 1:
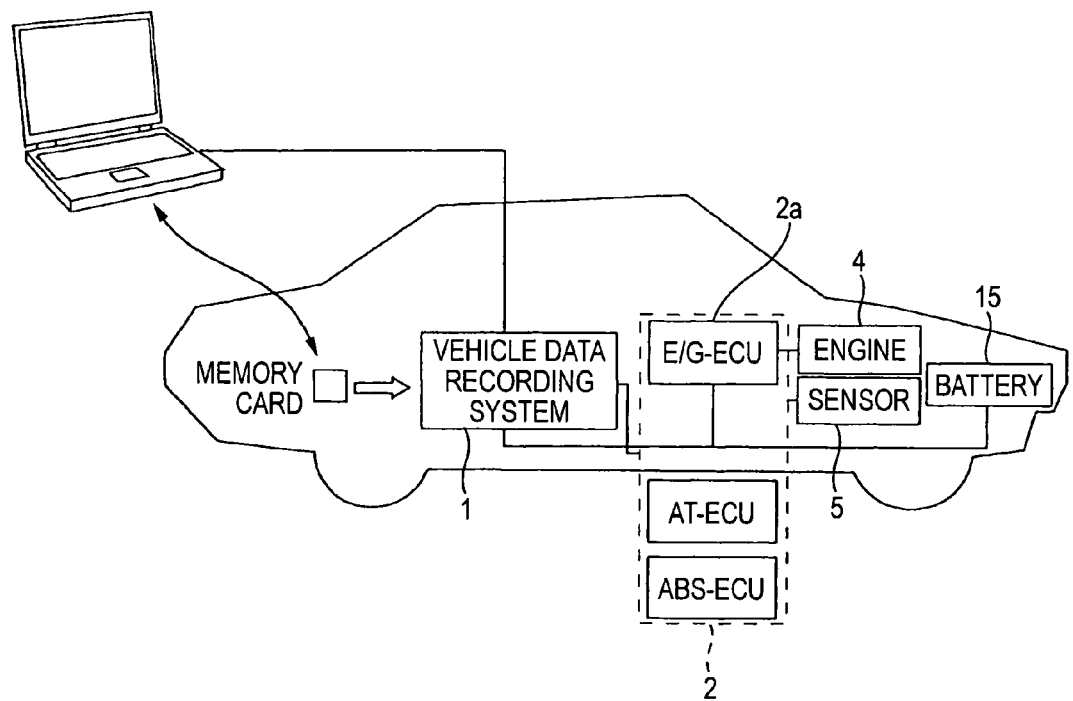
FIG. 1 is a view of an overall configuration including an operator-side system according to an embodiment of the present invention.

FIG. 1 is a view of an overall configuration including an operator-side system according to an embodiment of the present invention. First, a data recording system 1 (referred simply to as a "recording system" hereinafter) will be explained prior to an explanation of an operator-side system 20. The recording system 1 is a system that records various data about the vehicle (referred to as "vehicle data" hereinafter), and is installed into the vehicle, as the case may be. As the vehicle data that the recording system 1 records, control parameters of an electronic control unit 2 (referred to as an "ECU" hereinafter) mounted on the vehicle are listed. Typically controlled variables calculated in the ECU 2 are assumed as the "control parameters", but parameters (engine speed (rpm), speed (km/h), etc.) and learned values (control learning map) used to calculate the controlled variables are also contained in the controlled variables.

Now, the ECU 2 is mainly structured with a microcomputer and executes control of various units. In the present embodiment, as the ECU 2, an engine control unit 2a (referred simply to as an "E/G-ECU" hereinafter) for executing the control of an engine 4 will be explained mainly hereunder. However, the present invention can be applied similarly to a transmission control unit (AT-ECU) for executing control of the automatic transmission, an ABS control unit (ABS-ECU) for executing control of the anti-lock brake system, and the like. In this application, the term "ECU" is used as a general term for these control units.

The sensor-sensed signals supplied from various sensors 5 are input into the ECU 2 to sense the condition of the controlled object. As the sensors of this type, there are an intake air volume sensor, a boost pressure sensor, a vehicle speed sensor, an engine speed sensor, a coolant temperature sensor, an acceleration sensor (G sensor), and the like. The ECU 2 executes the calculation in regarding to various controlled variables in compliance with the previously-set control program, based on the sensor-sensed signals. Then, the controlled variables calculated by this calculation are output to various actuators. For example, the E/G-ECU 2a executes the calculation about the fuel injection interval (fuel injection quantity), the ignition timing, the throttle opening angle, etc. and then outputs the control signals to various actuators in response to the calculated controlled variables, and so on. Respective ECUs 2 installed into the vehicle are connected mutually via the K-line (one serial communication standard) or the CAN (Controller Area Network), and they can share mutual information by executing the serial communication via these communication lines. In this case, all the sensor-sensed signals are not always input commonly into respective control units constituting the ECU 2. The sensor-sensed signals required for individual control units are enough to execute the control.

Also, the self-diagnosis program used to diagnose the fault of each portion in the controlled object is installed into the ECU 2, and automatically diagnoses operating conditions of the microcomputer, the sensors 5, etc. at an appropriate period. When the fault is found by this diagnosis, the ECU 2 generates the diagnosis code to deal with the fault contents and then stores this code in a predetermined address of a back-up RAM in the ECU 2. Also, the ECU 2 executes an alarming process such that the MIL lamp is caused to turn ON or turn ON/OFF, or the like, as the case may be.

As the case where the recording system 1 is installed into the vehicle, the case of periodic inspection, the case where the user brings the vehicle into the service shop when the user found any trouble, or the like may be considered. In the former case, the test run of the vehicle is carried out by the service man. In this case, the recording system 1 acquires the vehicle data in a test run period on demand, and records the acquired vehicle data as the case may be. Also, in the latter case, the vehicle is returned once to the user except for the case where the service man can easily identify the trouble. In this case, the recording system 1 acquires the vehicle data at any time in the situation that the vehicle is normally driven by the user, and records the acquired vehicle data if necessary. After the test run conducted by the service man is finished or when the vehicle is carried into the service shop once again, the recording system 1 is removed from the vehicle. Then, in order to decide whether or not the fault arose in the vehicle or to identify the cause when the fault arose, the vehicle data recorded in the recording system 1 are employed.

Figure 2:
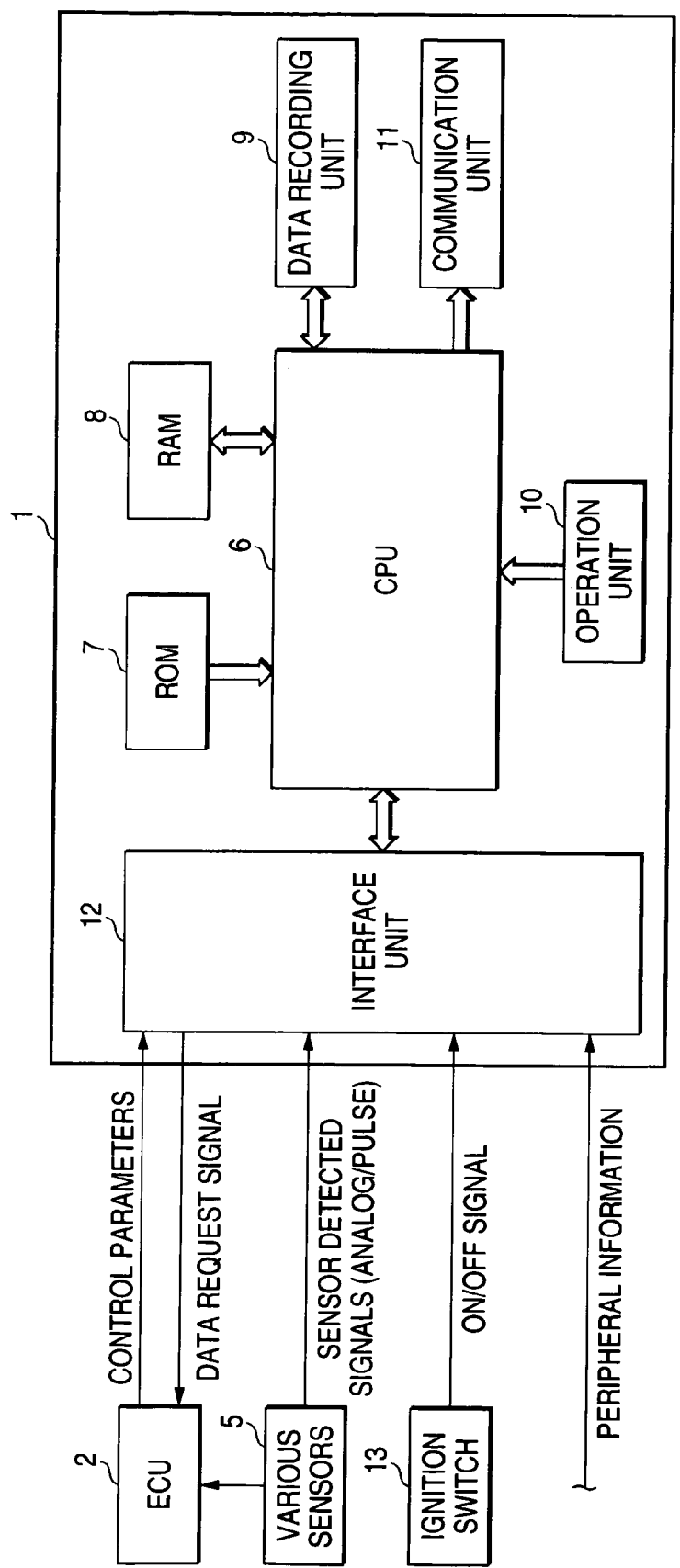
FIG. 2 is a block diagram showing a system configuration of a recording system.

FIG. 2 is a block diagram showing a system configuration of the recording system 1. The recording system 1 is composed mainly of a CPU 6. Then, a ROM 7, a RAM 8, a data recording unit 9, an operation unit 10, a communication unit 11, and an interface unit 12 are connected to buses that are connected to the CPU 6. The CPU 6 conducts the control of the overall recording system 1, and reads the control program stored in the ROM 7 and then executes the process in compliance with this program. The RAM 8 constitutes a work area that stores temporarily various process data executed by the CPU 6, etc., and also has a function as a buffer that records temporarily the vehicle data acquired on a time-series basis.

The vehicle data recorded in the RAM 8 are recorded in the data recording unit 9, that the external systems can access, by the CPU 6 on the assumption that conditions described later are satisfied. In the present embodiment, in view of the versatility of the data recorded in the data recording unit 9, the card type nonvolatile memory that can be detachably attached to the recording system 1, e.g., the flash memory type memory card, is used as the data recording unit 9. For this purpose, the recording system 1 has a socket (or a drive) via which the CPU 6 can access the memory card. In the case where the recording system 1 is incorporated into the vehicle, the memory card is inserted previously into the socket by the service man. Thus, the CPU 6 can record the vehicle data on the memory card that corresponds to the data recording unit 9, and can read the information recorded on the memory card. As the memory card of this type, various storing media such as SmartMedia, SD memory card, and so on can be employed. The memory capacities of these memory cards are set variously in a range of 8 MB to 1 GB, and thus the memory card having a predetermined memory capacity can be employed at user's option.

After the faulty conditions that are caused in the vehicle as the recorded object are assumed, mode files corresponding to the faulty conditions are stored in the memory card serving as the data recording unit 9. The mode file is read by the CPU 6, and then used as the file to set the operating conditions of the recording system 1, i.e., the data contents to be recorded and the conditions. In this case, details of the mode files and the mode file setting process will be described later, and therefore their explanation will be omitted herein.

The operation unit 10 is structured by a remote controller to which operation switches are provided, and this remote controller can be operated by the driver. The operation signal is output from the operation unit 10 to the CPU 6 when the operation switches are operated by the driver. Thus, the CPU 6 records the vehicle data recorded in the RAM 8 in the data recording unit 9. In other words, the operation of the operation switches functions as the trigger condition executed at any timing by the driver.

When the recording of the vehicle data that satisfy the acquiring conditions is completed satisfactorily, the communication unit 11 informs the user of a recording completion. In the present embodiment, the communication unit 11 is mainly structured by LEDs, and is controlled to turn ON or turn ON and OFF when the recording of the vehicle data that are described in the acquiring conditions is appropriately ended. Thus, the communication unit 11 can inform effectively the user of the recording completion of the vehicle data. In this case, the communication unit 11 may be composed of the CRT or the liquid crystal display, or the speaker, or the like, and various configurations that are capable of informing the driver of the recording completion may be employed.

The interface unit 12 contains various interfaces used to transfer the data on the vehicle side. The recording system 1 is connected to the CAN or the K-Line on the vehicle side via this interface unit 12, and can hold two-way data communication with the ECU 2 on the vehicle side. Thus, the recording system 1 can not only get the control parameters from the ECU 2 side but also grasp the situation of the ECU 2 such as the generation of the diagnosis code, etc. Also, the output signals supplied from various sensors 5 mounted on the vehicle are input into the interface unit 12 directly or indirectly via the ECU 2. Therefore, as the information that accompany the control parameters, the recording system 1 can record the sensor-sensed signals sensed by various sensors 5 and the peripheral information of the vehicle. Here, the peripheral information of the vehicle are information about the peripheral outside of the vehicle. An atmospheric temperature on the outside of the vehicle, an atmospheric pressure on the outside of the vehicle, an altitude and an absolute position (latitude/longitude) in the periphery of the vehicle, etc. correspond to such peripheral information. Also, a signal (ON signal/OFF signal) that is generated in synchronism with ON or OFF of an ignition switch 13 is input into the interface unit 12 together with these information. In addition, the recording system 1 can execute two-way communication with the external PC (the operator-side system 20) via the interface unit 12 in the network environment such as LEN, or the like.

Figure 3:
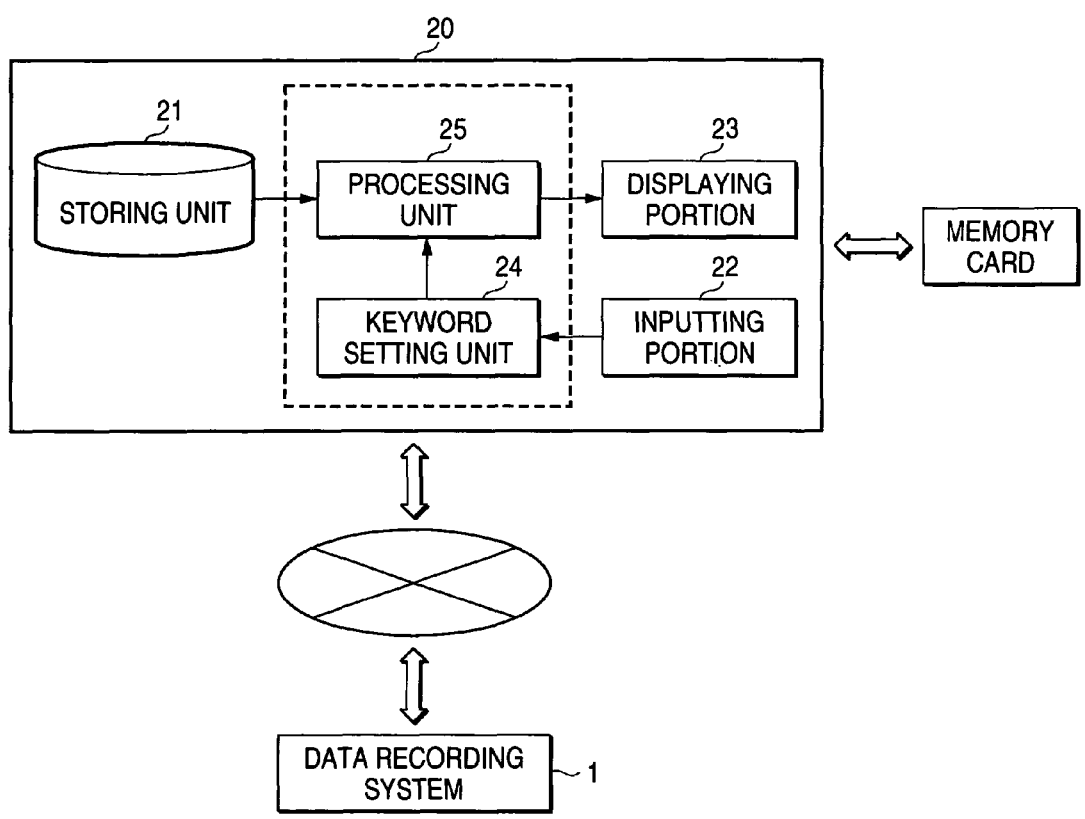
FIG. 3 is a view of a system configuration of the operator-side system.

FIG. 3 is a view of a system configuration of the operator-side system 20. Selection of the mode files to be stored in the data recording unit 9 is carried out by the operator (typically the service man) by using the operator-side system 20. The operator-side system 20 is mainly structured by a CPU, a ROM, a RAM, and an input/output interface, and can transmit/receive the information to/from the recording system 1 via the network environment (LAN in the present embodiment). As such operator-side system 20, a personal computer (PC) is taken by way of example. In addition to this, the operator-side system 20 has a storing unit 21, an inputting portion 22 such as a keyboard, a mouse, or the like, and a displaying portion 23 such as a CRT, an LCD, or the like. As the storing unit 21, for example, an external memory device such as a magnetic disk (HDD), a memory card in which an electrically erasable and programmable ROM (EEPROM) is built, or the like, or an internal memory device such as RAM, or the like may be employed.

FIG. 4 is an explanatory view showing an example of the mode file. The mode file is composed of the acquired contents and the acquiring conditions. The acquired contents are classifications of the vehicle data as the recorded object. The acquiring conditions are conditions that are applied to acquire/record the vehicle data in response to the acquired contents. A sampling rate, trigger conditions, a recording time, etc. correspond to the acquiring conditions. The sampling rate is a period at which the vehicle data are collected, and various periods are set in answer to the acquired contents. The trigger conditions are the conditions that are applied to record the acquired vehicle data from the RAM 8 to the data recording unit 9. As the trigger conditions, predetermined points (e.g., vehicle speed=0 km/h, engine speed=0 rpm, and the like) in the time-dependent transition of the vehicle data, a point of time when the ignition switch 13 is turned ON, a point of time when the failure code such as the misfire decision is generated, start and end points of the data acquisition, a point of time when the MIL lamp is turned ON, etc. may be listed. The recording time is a time length of the vehicle data that are recorded from the RAM 8 to the data recording unit 9. For example, 10 minute before and after the trigger conditions are satisfied, etc. may be listed.

After various faulty conditions that arise in the vehicle are assumed, the acquired contents and the acquiring conditions that are useful to identify the faulty conditions are set in advance appropriately in the mode files in the experiment or the simulation. In an example shown in FIG. 4, a mode file A is such a mode file that the rough idle is assumed as the faulty condition. In accordance with this mode file A, the recording system 1 gets the vehicle data such as engine speed, speed, intake pipe pressure, ignition advanced angle, fuel injection interval, controlled amount of the auxiliary air control valve, engine coolant temperature, etc. at a highest (e.g., 10 msec) sampling rate. Also, the vehicle data collected over 10 minute before and after the timing ark which the trigger conditions are satisfied are recorded in the data recording unit 9, while using as the trigger conditions the event that the engine speed becomes 0 rpm in a vehicle data collecting period. Alternately, the vehicle data collected over 10 minute before and after the timing at which the trigger conditions are satisfied are recorded in the data recording unit 9, while using as the trigger conditions the event that a changed amount of the engine speed exceeds a predetermined value. Meanwhile, a mode file B is such a mode file that the defective engine start is assumed as the faulty condition, and a mode file C is such a mode file that the abnormal vibration such as the surge, or the like is assumed as the faulty condition. In contrast, a mode file D is not prepared as the mode file in which the particular faulty condition is assumed, and the type of the vehicle data and the acquiring conditions required commonly to take measures against various faulty conditions are described.

In this manner, the faulty conditions that will be caused in the vehicle are assumed, and then a plurality of mode files corresponding to these faulty conditions are stored in the storing unit 21. Also, a plurality of file sets are stored in the storing unit 21 in units of these mode files. Each file set is correlated with the type and model of the different vehicle respectively. The reason why the file set is prepared to correspond to the type of the model of the vehicle is that, even though the same faulty condition is assumed, the type, etc. of the vehicle required to take measures become different owing to the difference in the type of the model of the vehicle. For this reason, the file set must be prepared every type and model of the vehicle. In each file set, the acquired contents and the acquiring conditions are different every type and model of the vehicle even in the corresponding faulty condition mode file. Also, ROM-ID of the ECU 2 corresponding to the unique identifier in the vehicle and the correspondence to the type and model of the vehicle are stored in the storing unit 21. Therefore, the type and model of the vehicle corresponding to ROM-ID can be identified by searching the storing unit 21.

FIG. 5 is an explanatory view of a map showing correspondences between the keywords and the faulty conditions. Respective mode files are correlated with the codes that can identify the correlated faulty conditions in individual mode files, and also correlated with the keywords that can identify the correlated faulty conditions in individual mode files. The code that is correlated with a certain faulty condition is the diagnosis code generated by the ECU 2 that is incorporated in the vehicle in which the faulty condition arises. The keyword that is correlated with a certain faulty condition is the character string that reflects the condition of the vehicle in which the faulty condition arises. As shown in FIG. 5, when "Rough idle" is set as the faulty condition, for example, the keyword that is correlated with this condition is the character string such as engine step (engine stall), rough idle, lack of stability of the idling, wobbling of engine noise, vibration, or the like, and the code that is correlated with this condition is TCXX.

In the operator-side system 20, the CPU executes the mode file setting process in compliance with the control program stored in the ROM. When the operator-side system 20 that is in the running state of the control program is functionally viewed, this system 20 has a keyword setting unit 24 and a processing unit 25. The keyword setting unit 24 sets the diagnosis code obtained from the ECU 2 via the network, which can transmit/receive the information to/from the control unit mounted on the vehicle, and the keyword input by the operator as search keys. The processing unit 25 identifies the mode file, which corresponds to the search key, among a plurality of mode files stored in the storing unit 21 based on the search key.

Figure 7:
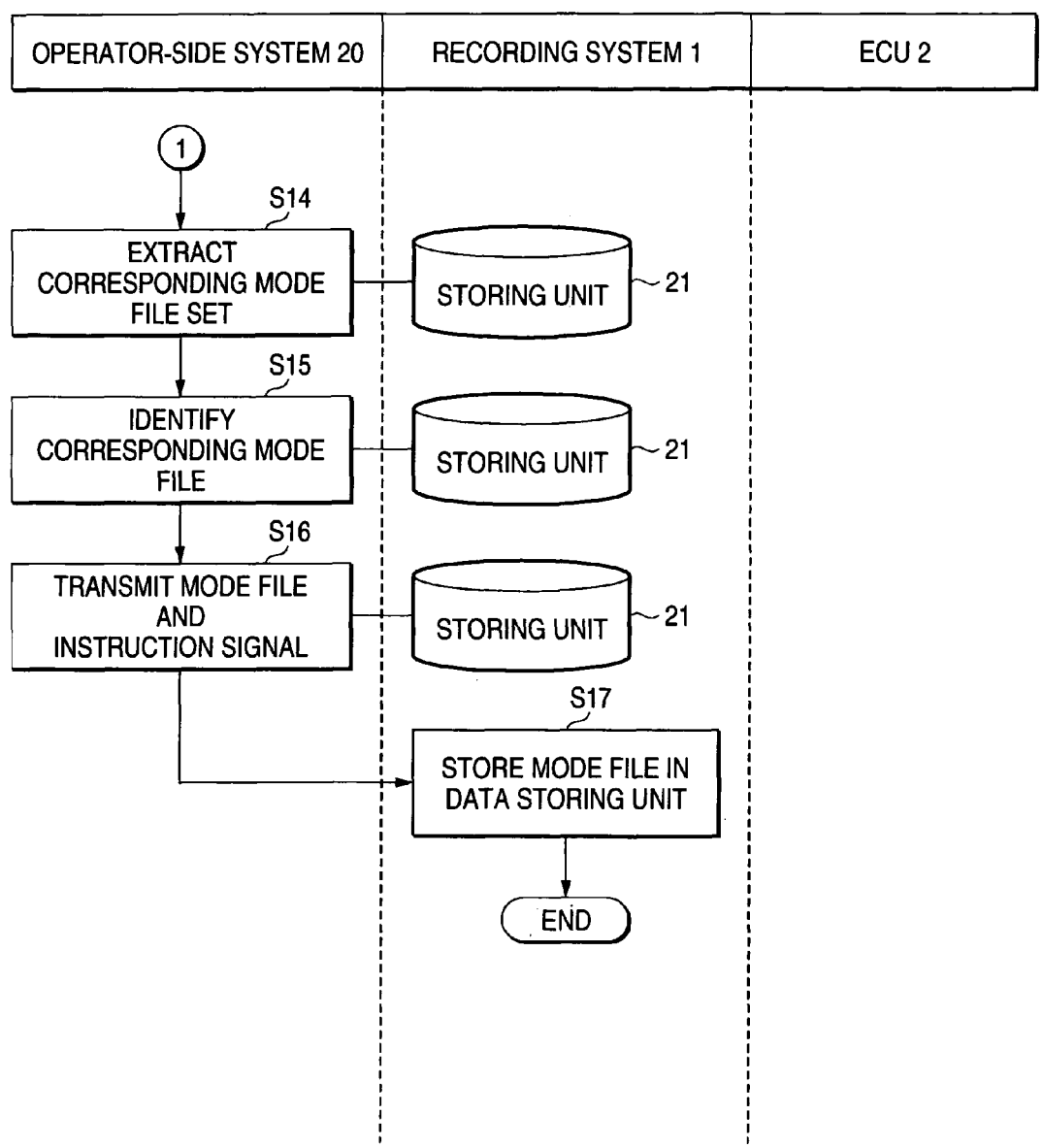
FIG. 7 is a flowchart showing procedures of setting the mode file.

FIG. 6 and FIG. 7 are flowcharts showing procedures of setting the mode file. This setting process is executed on-line by connecting the recording system 1, which is installed into the vehicle and can hold the data communication with the ECU 2, and the operator-side system 20 via the network. First, in step 1, an instruction signal is transmitted to the recording system 1 to acquire an identifier peculiar to the vehicle (ROM-ID of the ECU 2 in the present embodiment) from the ECU 2.

When received the instruction signal, the recording system 1 transmits a request-to-send signal of the ROM-ID to the ECU 2 (step 2). When received the request-to-send signal, the ECU 2 reads the ROM-ID by searching the inside of the own ROM (step 3), and then transmits the read RON-ID to the recording system 1 as ID information (step 4). Then, when received the ID information, the recording system 1 decides that such system acquired the information in response to the request-to-send signal and then transmits this ID information to the operator-side system 20 (step 5).

In step 6 following step 5, the operator-side system 20 that received the ID information identifies the type and the model of the vehicle as the recorded object by looking up this ID information, based on the correlation between the ROM-ID stored in the storing unit 21 and the type and the model of the vehicle.

In step 7, the operator-side system 20 transmits an instruction signal to the recording system 1 to acquire the diagnosis code that was generated in the ECU 2. When received the instruction signal, the recording system 1 transmits a request-to-send signal of the diagnosis code to the ECU 2 (step 8). When received the request-to-send signal, the ECU 2 reads the diagnosis code by searching its own back-up ROM (step 9), and then transmits the read diagnosis code to the recording system 1 as code in information (step 10). In this case, when the diagnosis code was not generated, the information to the effect that the diagnosis code was not generated is transmitted to the recording system 1 as the code information. Then, when the recording system 1 received the code information, such system decides that it acquired the information in response to the request-to-send signal, and then this code information is transmitted to the operator-side system 20 (step 11).

In step 12 following step 11, the operator-side system 20 that received the code information causes the displaying portion 23 to display an input screen for the keyword. A predetermined character string is input by the operator in response to this display (step 13). In inputting the character string, the operator asks the driver previously about the state of the vehicle and then inputs the character string in answer to the vehicle based on the asked result. In this case, it is preferable that the operator should input the corresponding keyword selectively by making previously a list of keyword groups that are correlated with the mode files respectively.

Then, the mode file is identified by using the type and model of the vehicle, the diagnosis code, and the input keyword as the search keys. More particularly, first the corresponding file set is extracted based on the type and model of the identified vehicle by searching the storing unit 21 (step 14). Then, the mode file corresponding to the search key is identified among a plurality of mode files based on the search key by searching the extracted file set (step 15). In case a plurality of search keys are present, it may be considered that plural mode files correspond to them. In this case, the mode file having the largest hit number of times of the search keys is selected alternatively from these mode files. For example, in case "engine stop", "vibration", and "TCXX" are present as the search key, "the mode file A (the faulty condition: rough idle)" that has the larger hit number of times of the keyword than "the mode file C (the faulty condition: abnormal vibration)" is identified. Here, in case the faulty condition corresponding to the keyword is not present, the mode file that is not correlated with the faulty condition (for example, the mode file D shown in FIG. 5) is identified as the mode file to be set in step 16.

The operator-side system 20 reads the identified mode file from the storing unit 21. Then, the operator-side system 20 transmits the read mode file to the recording system 1 and also transmits the instruction signal that instructs the transmitted mode file as the mode file to be set (step 16). When received the mode file, the recording system 1 stores the mode file in the data storing unit 9 based on this instruction signal (step 17). As a result, the setting of the mode file by the operator-side system 20 is completed.

Next, a recording operation of the recording system 1 in which the mode files are set by the operator-side system 20 will be explained hereunder. When a power supply of the recording system 1 is turned ON to start its system, the operating conditions are set based on the mode file recorded in the data storing unit 9. More particularly, the acquired contents set forth in the mode file are read and then set as the vehicle data that are to be acquired from the vehicle side, and the acquiring conditions are read and then set as the conditions in regarding to the acquisition/recording of the vehicle data. As a result, the recording system 1 is set to a state that the system executes acquiring/recording operations based on the mode file.

When the operating conditions are set, first the data request signal is output to the ECU 2 to get the control parameters set as the acquired contents. The ECU 2 is executing the normal system control simultaneously with the start of the vehicle. When the ECU 2 received the data request signal, such ECU 2 outputs the control parameters corresponding to the acquired contents to the recording system 1 until its own operation is ended, while executing this system control. When the recording system 1 received the control parameters in response to the data request signal, such recording system 1 acquires such control parameters at a predetermined sampling rate and then records the acquired control parameters in the RAM 8 on a time-series basis. Also, when the vehicle data other than the control parameters of the ECU 2, i.e., sensor-sensed signals, peripheral information, or the like are contained in the acquired contents, the recording system 1 also gets these data via the interface unit 12 and then records them in the RAM 8 on a time-series basis.

In the case where the data corresponding to the acquired contents, e.g., the engine speed, are present in both the control parameters (calculated values) of the ECU 2 and the sensor-sensed signals, the recording system 1 can acquire the sensor-sensed signals together with the control parameters and record both data in the RAM 8. Also, if sensors for sensing these peripheral information are individually provided, the recording system 1 can acquire the peripheral information as the sensor-sensed signals from respective sensors. In this case, if the sensors capable of sensing these information (e.g., thermometer, GPS, etc.) are fitted on the vehicle side, these output signals may be utilized.

Then, when the trigger conditions are satisfied during the data collection, the vehicle data recorded in the RAM 8 are recorded in the data storing unit 9 according to the acquiring conditions. For example, in the mode file A shown in FIG. 3, it is decided that the trigger conditions are satisfied when the acquired engine speed becomes 0 rpm. In this case, the vehicle data over 5 minute before the timing at which the trigger conditions are satisfied are read from the RAM 8 and then recorded in the data storing unit 9. In addition to this, the vehicle data recorded in the RAM 8 over 5 minute after the timing at which the trigger conditions are satisfied are also recorded in the data storing unit 9.

Figure 8:
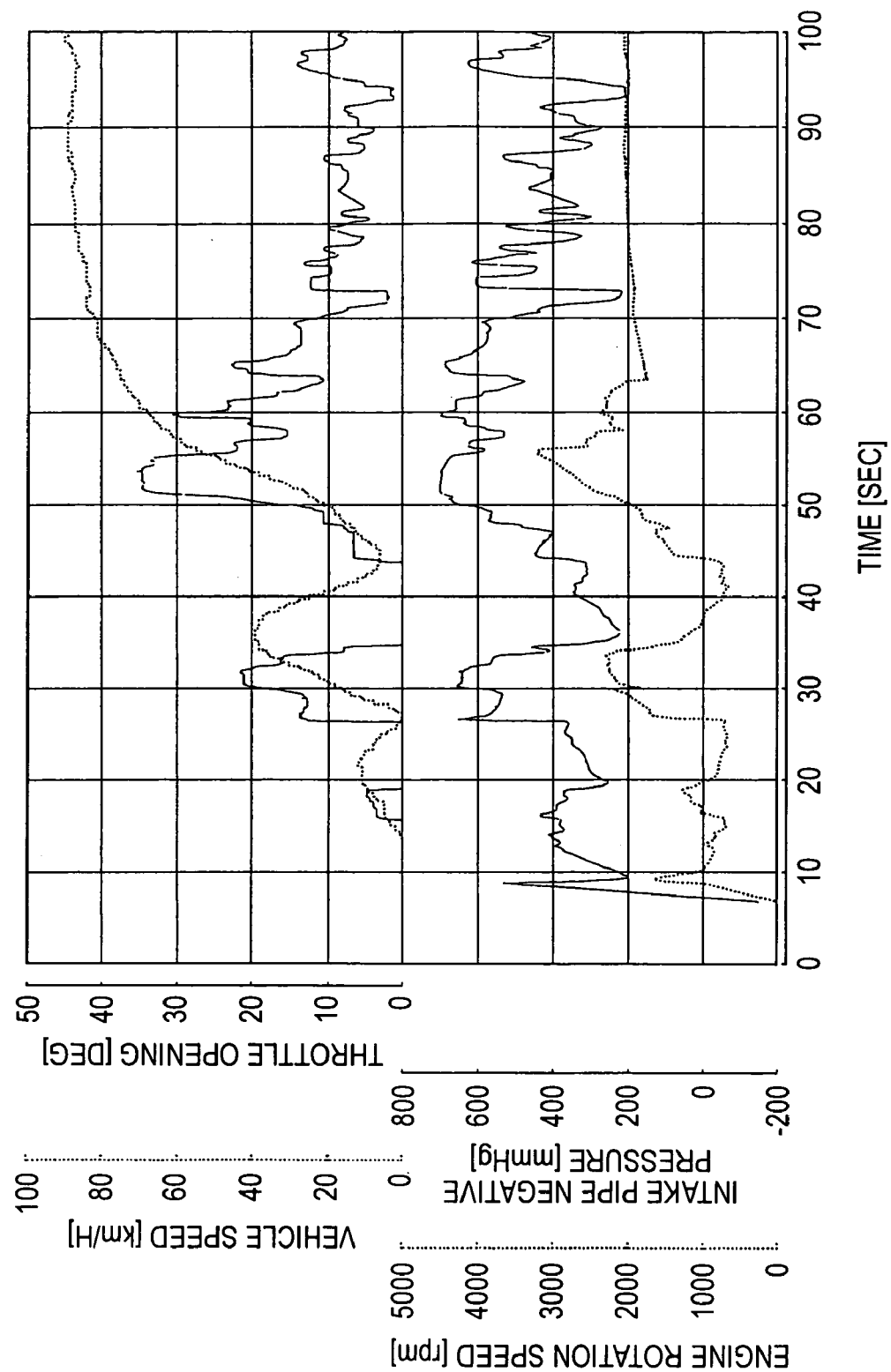
FIG. 8 is an explanatory view showing time-series transitions of vehicle data recorded in the data recording unit.

FIG. 8 is an explanatory view showing time-series transitions of the vehicle data recorded in the data recording unit 9. In FIG. 8, a speed (km/h), a throttle opening angle (deg), an engine speed (rpm), and an intake pipe negative pressure (mmHg) are shown as the vehicle data. As shown in FIG. 8, the vehicle data recorded in the data recording unit 9 are recorded to correlate with the time information upon the collection. As this time information, either an absolute time indicated by date/time or a relative time indicated by the time elapsed from the recording start is employed.

Then, when the transmission of the control parameters from the ECU 2 is interrupted, the recording system 1 decides that the driving of the vehicle is stopped, then executes a shut-down process such that the recording system 1 can shut down the power supply safely, and then shuts down the power supply.

In this manner, according to the present embodiment, while employing both the diagnosis code acquired from the ECU 2 and the keyword input by the operator as the search keys, the mode file corresponding to the search keys can be identified among a plurality of mode files. In this fashion, the number of the assumed mode files becomes enormous if various faulty conditions are contained, nevertheless the appropriate mode file can be identified automatically and easily because the mode files are narrowed down by using the search keys that contain not only the codes generated in the ECU 2 but also the keywords input by the operator. In the mode files, after the fault conditions that will arise in the vehicle are assumed, the data contents and the acquiring conditions useful for identifying the faulty conditions are correlated in advance appropriately with each other in the experiment or the simulation. As a result, the mode file that agrees with the faulty condition of the vehicle can be set in the recording system 1 and therefore the effective recording of the necessary vehicle data can be attained.

By the way, it may be considered that, if the mode files corresponding to various faulty conditions are stored previously on the recording system 1 side, the mode file is set by selecting alternatively one of them. However, the assumed faulty conditions are various and thus the number of the mode files becomes huge if the type and the model of the vehicle are also contained in the faulty conditions. For this reason, according to such approach, because the recording capacity enough to store the mode files is needed on the recording system 1 side, there is a possibility that a configuration of the system is enlarged on a large scale. In that respect, according to the present embodiment, because these mode files are stored in the operator-side system 20 and then the appropriate mode file selected from these mode files can be provided to the recording system 1 side, such problem can be overcome.

In the present embodiment, the mode file setting process is executed on-line, but such setting process may be executed off-line. More specifically, as shown in FIG. 1, in the configuration in which the operator-side system 20 can access the memory card serving as the data recording unit 9, the mode file is identified like the above process and then such mode file is recorded in the memory card. Then, the memory card is inserted into the socket of the recording system 1 and then the CPU 6 reads the mode file being stored in the memory card, so that the setting of the mode file is carried out. Here, since the information cannot be transferred between the operator-side system 20 and the recording system 1 in the off-line process, the ROM-ID of the ECU 2 and the diagnosis code in the ECU 2 cannot be acquired. Therefore, in such case, the information about the type and the model of the vehicle and the diagnosis code are acquired in advance and then are input by the operator.

In the present embodiment, the ROM-ID of the ECU 2, the character strings reflecting the faulty conditions, and the diagnosis codes are exemplified as the keywords. However, in the correspondence between the keyword and the faulty condition except the above, the driving environments such as highland, cold district, etc., which correspond to the geographic elements through which the vehicle travels, may be correlated with the faulty conditions reflecting the geographic situations as the keyword. Also, the mode file may be set such that the input/output amplification gains of the sensor-sensed signals output from various-sensors 5 can be varied in response to the faulty condition. For example, in the case where the abnormal vibration is generated in the vehicle as the faulty condition, the sensed value of the G sensor is changed dynamically. Thus, it is possible that the recording system 1 side cannot fully record this change if the gain is set excessively large. Therefore, in light of such case, in the mode file in which the abnormal vibration is handled as the faulty condition, the sensor-sensed signal is acquired with the smaller gain than that in the mode file in which different faulty conditions are handled. In other words, it may be set previously in the mode file to change the sensitivity setting of the acceleration sensor.

In this case, the data recording unit 9 in the recording system 1 is not limited to the flash memory type memory card, and various recording media such as magnetic recording medium, optical recording medium, etc. may be applied widely. In this case, the vehicle data recorded in the RAM 8 are recorded on the recording media via various drives controlled by the CPU 6. In other words, the data recording unit 9 in the present invention is not always provided as the constituent element of the recording system 1. The recording system 1 will suffice if such system can record the vehicle data at least on the data recording unit 9. In this case, it is not always needed that the data recording unit 9 should be detachably attached, and the data recording unit 9 may be provided integrally with the recording system 1.

It will be understood to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An operator-side system comprising:
   a storing unit for storing a plurality of computer-readable mode files, codes and keywords, wherein the codes are respectively correlated with the mode files and identify a faulty condition of a vehicle, and the keywords are respectively correlated with the mode files and identify the faulty condition of the vehicle;
   a keyword setting unit for setting the codes and the keywords as search keys, wherein the codes are acquired via a network from a control unit mounted on the vehicle, the keywords are input by an operator, and the network transmits/receives information to/from the control unit; and
   a processing unit for identifying the mode file corresponding to the search keys among the plurality of mode files based on the search keys,
   wherein contents of the mode files comprise types of the vehicle data and acquiring conditions, which are required to take measures against a particular faulty condition, out of a plurality of different vehicle data that contain control parameters in the control unit; and
   wherein the codes and the keywords are different from the vehicle data and acquiring conditions in the correlated mode files.

2. The operator-side system according to claim 1, wherein the codes comprise diagnosis codes generated in the control unit.

3. The operator-side system according to claim 1, wherein the keywords comprise character strings reflecting states of the vehicle assumed in the faulty conditions.

4. The operator-side system according to claim 3, wherein the keywords further comprise character strings representing driving environments of the vehicle.

5. The operator-side system according claim 1, wherein the storing unit further stores a predetermined mode file in which types of the vehicle data and acquiring conditions, which are required commonly to take measures against various faulty conditions that are not correlated with the codes and the keywords, are described, and
   the processing unit identifies the predetermined mode file when the mode file corresponding to the search keys is not identified.

6. The operator-side system according to claim 1, wherein the storing unit further stores:
   a plurality of file sets respectively correlated with different types and models of vehicles and respectively comprising units of the plurality of mode files; and
   identifiers of the control unit respectively correlated with types and models of a plurality of vehicles, and
   wherein the processing unit identifies a type and a model of the vehicle, which correspond to the identifiers acquired, among the types and the models of the plurality of vehicles based on the identifiers acquired from the control unit, and
   the processing unit also identifies a file set, which corresponds to the type and the model of the vehicle identified, among the plurality of file sets.

7. The operator-side system according to claim 1,
   wherein the mode files contain one or more of values learned by the control unit and peripheral information of the vehicle, as the acquired contents, and
   wherein the values learned by the control unit comprise signals from sensors.

8. The operator-side system according to claim 1, wherein a sensitivity of an acceleration sensor is set differently in response to individual mode file in the plurality of mode files.

9. The operator-side system according to claim 1, wherein the network transmits/receives information to/from a data recording system, wherein the vehicle data is recorded to the data recording system based on the types and the acquiring conditions described in the mode file decided, and the data recording system can execute the data communication with the control unit, and
  wherein the keyword setting unit acquires the codes from the control unit via the data recording system.

10. An operator-side device comprising:
  a storing unit for storing a plurality of computer-readable mode files, codes and keywords, wherein the codes are respectively correlated with the mode files and identify a faulty condition of a vehicle, and the keywords are respectively correlated with the mode files and identify the faulty condition of the vehicle;
  a keyword setting unit for setting the codes and the keywords as search keys, wherein the codes are acquired via a network from a control unit mounted on the vehicle, the keywords are input by an operator, and the network transmits/receives information to/from the control unit; and
  a processing unit for identifying the mode file corresponding to the search keys among the plurality of mode files based on the search keys,
  wherein contents of the mode files stored in the storing unit comprise types of the vehicle data and acquiring conditions, which are required to take measures against a particular faulty condition out of a plurality of different vehicle data that contain control parameters in the control unit; and
  wherein the codes and the keywords are different from the vehicle data and acquiring conditions described in the correlated mode files.

11. The operator-side system according to claim 10, wherein the respective mode file is stored in the storing unit prior to recording vehicle data.

12. The operator-side system according to claim 1, wherein the mode files comprise acquired contents and acquired data to identify the faulty condition and the acquired contents and the acquired data are set in advance in the mode files.

13. The operator-side system according to claim 1, wherein the processing unit identifies the mode file which is correlated most with, the code or the keyword corresponding to the search key.

14. An operator-side system comprising:
  a storing unit for storing a plurality of computer-readable mode files, codes and keywords, wherein the codes are respectively correlated with the mode files;
  a keyword setting unit for setting the codes and the keywords as search keys, wherein the codes are acquired via a network from a control unit mounted on the vehicle, the keywords are input by an operator, and the network transmits/receives information to/from the control unit; and
  a processing unit for identifying the mode file corresponding to the search keys among the plurality of mode files based on the search keys,
  wherein contents of the mode files comprise types of the vehicle data and acquiring conditions, and the processing unit identifies the mode file which is correlated most with the code or the keyword corresponding to the search key; and
  wherein the codes and the keywords are different from the vehicle data and acquiring conditions described in the correlated mode files.

* * * * *